United States Patent
Shin

(10) Patent No.: US 10,364,179 B2
(45) Date of Patent: Jul. 30, 2019

(54) METHOD FOR MANUFACTURING GLASS CLICHE USING LASER ETCHING AND APPARATUS FOR LASER IRRADIATION THEREFOR

(71) Applicant: LG CHEM, LTD., Seoul (KR)

(72) Inventor: Bu-Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 14/267,270

(22) Filed: May 1, 2014

(65) Prior Publication Data

US 2014/0238606 A1    Aug. 28, 2014

Related U.S. Application Data

(63) Continuation of application No. 12/680,829, filed as application No. PCT/KR2008/005719 on Sep. 26, 2008, now Pat. No. 8,845,916.

(30) Foreign Application Priority Data

Oct. 1, 2007   (KR) .................. 10-2007-0098716

(51) Int. Cl.
*C03C 15/00*    (2006.01)
*B41M 5/26*    (2006.01)

(52) U.S. Cl.
CPC ............. *C03C 15/00* (2013.01); *B41M 5/262* (2013.01)

(58) Field of Classification Search
USPC ........................................ 156/345.15, 345.5
See application file for complete search history.

(56) References Cited

U.S. PATENT DOCUMENTS 4,494,865 A * 1/1985 Andrus ..................... B41M 5/26
  355/32
4,636,403 A * 1/1987 Fisanick ................. C03C 17/06
  148/DIG. 140

(Continued)

FOREIGN PATENT DOCUMENTS

CN    1392905 A    1/2003
JP    57-7938 A    4/1982

(Continued)

OTHER PUBLICATIONS

Machine Generated English Translation of JP 1993-102110A. Published Apr. 23, 1993.*

(Continued)

*Primary Examiner* — Sylvia MacArthur
(74) *Attorney, Agent, or Firm* — Dentons US LLP

(57) ABSTRACT

A method for manufacturing a glass cliché using laser etching includes a dipping step for dipping a glass cliché, which will be etched, into an etching solution, a patterning step for irradiating laser to the glass cliché dipped in the etching solution to form a pattern therein, and a washing step for washing the patterned glass cliché. This method allows making a cliché with a high aspect ratio and fine line widths in comparison to a conventional cliché manufacturing method using photoresist for etching, and also ensures more efficient energy consumption and higher etching efficiency rather than an etching method using laser only.

3 Claims, 7 Drawing Sheets

(56) References Cited

U.S. PATENT DOCUMENTS

| | | | |
|---|---|---|---|
| 4,922,077 A * | 5/1990 | Gordon | B23K 26/04 219/121.61 |
| 5,126,531 A | 6/1992 | Majima et al. | |
| 5,128,224 A * | 7/1992 | Ohtake | H01J 9/142 313/402 |
| 5,932,119 A * | 8/1999 | Kaplan | B23K 26/032 219/121.68 |
| 6,180,912 B1 * | 1/2001 | Tatah | B23K 26/067 219/121.6 |
| 6,547,919 B2 * | 4/2003 | Bang | G02B 5/1857 156/345.11 |
| 7,052,575 B1 * | 5/2006 | Rangarajan | H01J 37/32935 156/345.13 |
| 7,078,651 B2 * | 7/2006 | Jennings | B23K 26/03 219/121.78 |
| 7,179,584 B2 * | 2/2007 | Sekigawa | G03F 7/70283 347/233 |
| 8,842,144 B2 * | 9/2014 | Kim | H01L 51/0013 347/224 |
| 2002/0093562 A1 * | 7/2002 | Katayama | B41M 5/262 347/238 |
| 2005/0046792 A1 * | 3/2005 | Ito | B23K 26/04 351/159.75 |
| 2006/0204904 A1 | 9/2006 | Ogawa | |
| 2007/0022887 A1 | 2/2007 | Seo et al. | |
| 2007/0062919 A1 * | 3/2007 | Hamada | B23K 26/0626 219/121.71 |
| 2014/0238606 A1 * | 8/2014 | Shin | C03C 15/00 156/345.15 |

FOREIGN PATENT DOCUMENTS

| | | | |
|---|---|---|---|
| JP | 1993102110 A * | 4/1993 | |
| JP | 10-305374 | 11/1994 | |
| JP | 11-199400 | 7/1999 | |
| JP | 2003-195511 | 7/2003 | |
| JP | 2007-126692 A | 5/2007 | |
| KR | 2005038386 A * | 4/2005 | |
| KR | 10-2007-0000100 A | 1/2007 | |
| KR | 10-2007-0013439 A | 1/2007 | |
| WO | WO-2007061018 A1 * | 5/2007 | B28D 1/00 |

OTHER PUBLICATIONS

"YAG Laser Processing of Quartz Glass Using Solution" Ikeno, et al. ; Journal of Precise Engineering Association; vol. 55, No. 2, p. 335-340; 1989.

Translation of JP 11-199400 (1999), (6 pages).

Translated Abstract of JP 57-7938A Kobayashi (1982) (2 pages).

* cited by examiner (a)

(b)

US 10,364,179 B2

METHOD FOR MANUFACTURING GLASS CLICHE USING LASER ETCHING AND APPARATUS FOR LASER IRRADIATION THEREFOR

This application is a continuation of U.S. application Ser. No. 12/680,829, filed Mar. 30, 2010, which is a 35 U.S.C. § 371 National Stage entry of International Application No. PCT/KR2008/005719, filed on Sep. 26, 2008, and claims priority to Korean Application No. 10-2007-0098716, filed on Oct. 1, 2007, which are all hereby incorporated by reference in their entireties.

BACKGROUND OF THE INVENTION

Field of the Invention

The present invention relates to a method for manufacturing a glass cliché using laser etching and an apparatus for laser irradiation therefor, and more particularly to a method for manufacturing a glass cliché using the phenomenon that an etching speed of glass is relatively increased only in a portion to which laser is irradiated.

Description of the Related Art

To produce a flat panel display (FPD) such as a liquid crystal display (LCD) and a plasma display panel (PDP), various kinds of patterning processes for making electrodes, black matrix, color filters, separators, thin film transistors and so on are required.

In a general case, a photoresist is selectively removed using a photo mask by exposing and developing to make a photoresist pattern, and then the photoresist pattern is used for the patterning process. This patterning process using a photo mask uses a lot of materials such as photoresist and developing agent and also needs an expensive photo mask, which results in many processing steps or long processing time.

To solve this problem, there have been proposed various methods for printing a pattern-forming material directly such as ink jet printing or laser transcription, without using photoresist. As one of such methods, there is an offset printing in which a patterned material is transcribed to a blanket using a cliché and then the pattern of the blanket is transcribed onto a cliché.

The offset printing using a cliché ensures smaller material consumption and simpler process than a conventional method using photoresist and also ensures faster process speed than ink-jet printing or laser transcription. However, the offset printing needs clichés independently for substrates with different patterns, and a cliché generally made of glass is manufactured complicatedly and very expensive.

A general method for making the glass cliché is explained with reference to FIG. 1. A photoresist 102 is applied onto a glass cliché 101 by means of spin coating, dip coating, spray coating, slit coating, bar coating or the like, as shown in FIG. 1(a).

After that, a photo mask 103 is used to form a desired pattern as shown in FIG. 1(b) by means of exposure and development phenomena. During the exposure process, the photoresist 102 is selectively photo-sensitized by UV rays 104 passing through the photo mask 103 in which a desired pattern is already formed, and a pattern 105 is formed on the glass cliché as shown in FIG. 1(c) due to the difference of solubility for a developing solution between the photo-sensitized region and the non-sensitized region.

FIG. 1(c) shows the case adopting a positive photoresist, but a negative photoresist may also be used. In case the negative photoresist is used, a region irradiated by UV rays 104 remains but a region not photo-sensitized by UV rays is removed.

The glass cliché having the pattern of the photoresist 102 formed therein is dipped in a glass etching solution (not shown) as shown in FIG. 1(d), and then glass etching reaction occurs partially only on a region 106 where a glass cliché is exposed. Generally, an etching reaction of an amorphous material such as glass becomes an isotropic etching without no orientation, so an etching speed is identical in both depth and width directions of the glass.

Thus, as the etching reaction occurs, a glass etching region 106 becomes wider than the width of the pattern of the photoresist 102, and a bottom portion of the etching portion has a rounded shape, as shown in FIG. 1(d). As the etching work progresses, the etching continuously occurs in depth and width directions as shown in FIG. 1(e), so a width 107 of the etched glass cliché becomes gradually wider than the pattern of the photoresist 102.

If the etching is completed to a desired depth, the glass cliché is taken out of the etching solution and washed by a distilled water, and then the photoresist is removed to obtain a glass cliché 108 finally etched, as shown in FIG. 1(f).

In the method of making a glass cliché using such a wet etching, isotropic etching occurs as shown in FIG. 1, so the pattern is etched in its sides as much as the same thickness as the etched depth.

Thus, the pattern of photoresist used for etching should be formed with at least double margin of a desired etching depth, and due to this reason, there is a limit in precision for the pattern to be formed. Also, considering a room where an etching solution may penetrate, an actually etchable pattern should be three or four times as much as a minimal etching depth, so it is more difficult to form a pattern with fine line widths.

In addition, due to the nature of isotropic etching, the etching is made in a substantially circular shape between a wall and a bottom to be etched, so an etching depth is gradually varying, which results in deteriorated printing quality. Also, since a photoresist pattern should be formed prior to the etching process, many processes such as an exposure process using a photo mask and a photoresist development process using a developing solution are needed before the etching work, and also a process of removing the remaining photoresist is also added after the etching work is completed.

In addition to the above wet etching, a dry etching for etching a glass using plasma of an etching gas in a vacuum state is also available. The dry etching for etching a glass cliché using a gas containing fluorine such as CF4 and CF3H allows anisotropic etching, differently from the wet etching, so a line width is not widened or a region between a wall and a bottom is not etched in a circular shape as the dry etching progresses.

However, a vacuum chamber and an expensive etching gas should be prepared for the dry etching, which increase a cost for the etching work and makes it difficult to apply the etching work to large-scale matters or mass production.

Also, the drying etching makes an etching mask and an etching material be etched together, so the etching mask should have as slowest etching speed as possible. Generally, a mask layer made of metal such as chrome is used for glass etching, but this mask layer cannot be made too thick, so there is a limit in glass etching depth.

In addition, the dry etching needs to form a mask pattern prior to etching, similarly to the wet etching, so many processes such as preprocesses for vacuum-deposition of a metal mask layer, formation of a photoresist layer, exposure of the photoresist using a photo mask, development of the photoresist layer to form a pattern, etching of the metal layer used as a mask as well as postprocesses for removal of the metal mask after etching are required.

In order to solve the above problems in a glass cliche making process using wet etching or dry etching, a new method using laser etching is proposed in the Korean Laid-open Patent Publication No. 10-2007-0000100 or the like.

The Korean Laid-open Patent Publication No. 10-2007-0000100 discloses a method for making a cliché having a desired pattern by directly etching an insulating substrate with laser. In case a glass cliché is directly etched with laser to make a cliché, there may be advantages in process since an etching solution is not used. However, since the glass is removed by means of photothermolysis on regions irradiated by laser, the used laser should have a high power and an etching speed is relatively slow. Also, it is impossible to prevent generation of HAZ (Heat Affected Zone) that may cause pattern deterioration, and fine cracks may happen in the glass cliché due to thermal impacts caused by continuous irradiation of the laser with strong energy.

Along with them, since a roll means playing a role of moving a material transcribed to a glass cliché continuously transfers load to the glass cliché, the load may weaken durability of the glass cliché or causes fine cracks in the glass cliché. Also, residuals of pattern material, not moved by the roll means, may remain in a blanket.

SUMMARY OF THE INVENTION

The present invention is designed to solve the problems of the prior art, and therefore it is an object of the present invention to provide a method for etching a glass cliché with a high aspect ratio and high work efficiency by means of harmonized use of wet etching and laser etching.

In addition, another object of the present invention is to provide a method for etching a glass cliché, which may effectively disperse a physical load of a roll means, transferred to a glass cliché, and differentially control a laser irradiation area according to an irradiation time such that a pattern capable of minimizing residuals of a blanket may be formed on the glass cliché.

Other objects and advantages of the present invention will be explained below and understood from embodiments of the present invention. In addition, the objects and advantages of the present invention may be realized by combinations of components defined in the appended claims.

In order to accomplish the above object, the present invention provides a method for manufacturing a glass cliché using laser etching, comprising a dipping step for dipping a glass cliché, which will be etched, into an etching solution; a patterning step for irradiating laser to the glass cliche dipped in the etching solution to form a pattern therein; and a washing step for washing the patterned glass cliché.

Also, in the patterning step, a pattern may be formed by means of a plurality of laser irradiation surfaces applied to the glass cliché. In addition, the pattern formed by the plurality of irradiation surfaces is preferably made using a mask having a laser transmission pattern identical to the pattern to be formed on the glass cliché.

In the present invention, the patterning step includes an input step for receiving image information of a pattern to be formed; an calculating step for calculating area information of a laser irradiation surface corresponding to the image information; and an irradiating step for irradiating laser having differential irradiation areas according to irradiation time based on the calculation area information to form a pattern.

In addition, in the irradiating step, a pattern is preferably formed by irradiating laser whose irradiation area is decreased as the irradiation time goes.

In another aspect of the present invention, there is also provided an apparatus for laser irradiation, which is used for laser etching to form a pattern on a glass cliché dipped in an etching solution by irradiating laser thereto, the apparatus comprising a laser source for irradiating laser; an input unit for receiving shape information of the pattern to be formed; an calculation unit for calculating area information of a laser irradiation surface corresponding to the shape information; and a controller for controlling the laser source to irradiate laser having differential irradiation areas according to irradiation time based on the calculated area information.

In the apparatus for laser irradiation, the controller preferably controls the laser source to irradiate laser whose irradiation area is decreased as the irradiation time goes.

BRIEF DESCRIPTION OF THE DRAWINGS

Other objects and aspects of the present invention will become apparent from the following description of embodiments with reference to the accompanying drawing in which.

Figure 1:
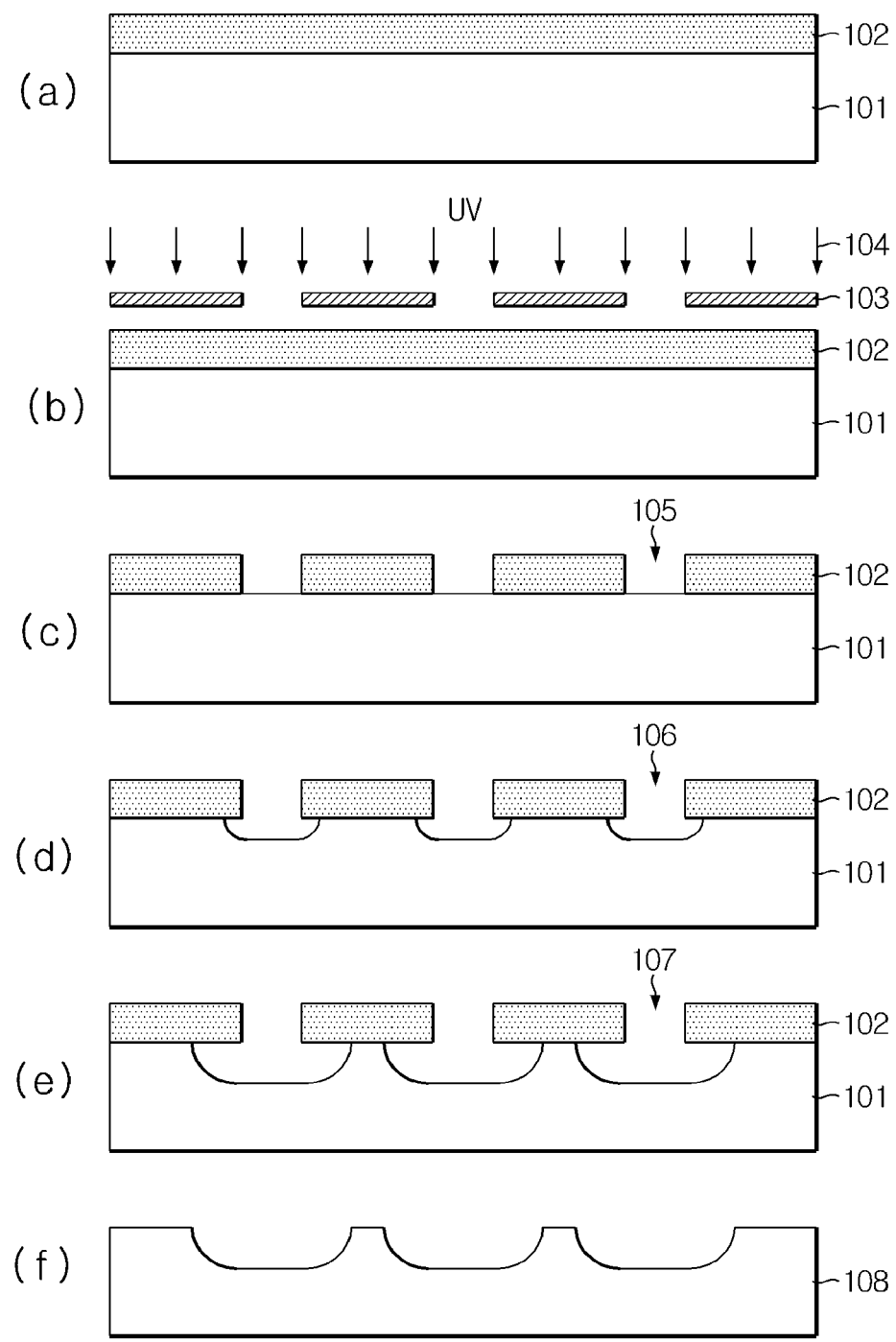
FIG. 1 is a flowchart illustrating a conventional method for manufacturing a general glass cliché.

| <Reference Numeral of Essential Parts in the Drawings> | |
|---|---|
| 300: laser irradiation apparatus | 302: input unit |
| 304: calculation unit | 306: controller |
| 308: laser source | 401: glass cliché |
| 402: irradiated laser | 403: blanket |
| 405: mirror | 410: shadow mask |

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 2:
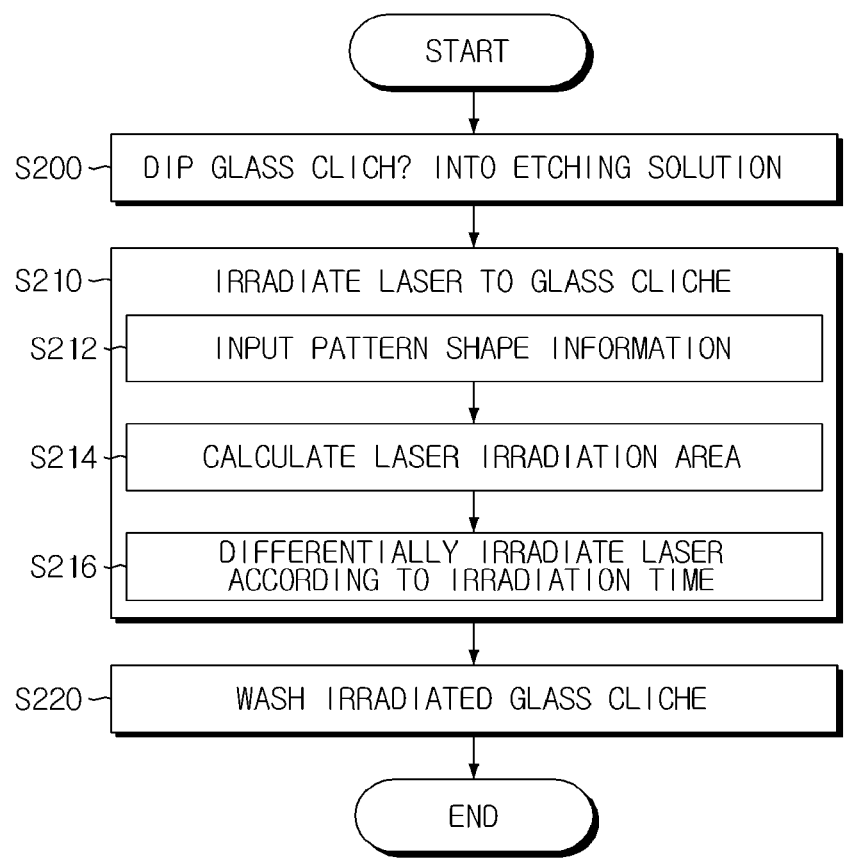
FIG. 2 is a flowchart illustrating a method for manufacturing a glass cliché according to one embodiment of the present invention.
Figure 3:
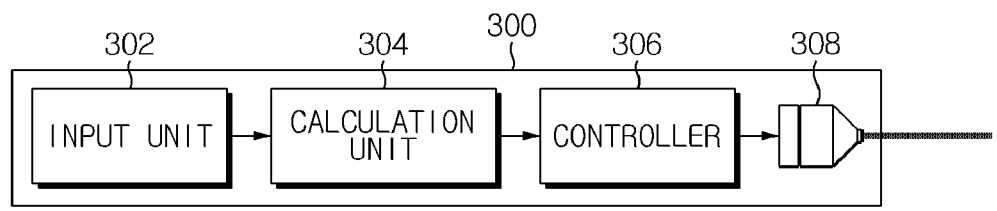
FIG. 3 is a block diagram showing a laser irradiation apparatus for laser etching according to one embodiment of the present invention.

Referring to FIG. 2 that is a flowchart illustrating processes of a method for manufacturing a glass cliché according to a preferred embodiment of the present invention, the glass cliché manufacturing method of the present invention includes a dipping step (S200) for dipping a glass cliché, which will be etched, into an etching solution, a patterning step (S210) for irradiating laser to the glass cliché dipped in the etching solution to form a pattern therein, and a washing step (S220) for washing the patterned glass cliché.

First, a glass cliché, which will be etched, is dipped in an etching solution used for wet etching (S200). The etching solution in which the glass cliché is dipped may use at least one solution selected from compounds containing hydrofluoric acid, ammonium fluoride or BOE (buffered oxide etch) solution.

In case the glass cliché is dipped in the etching solution, the glass cliché is preferably fixed to a position fixing means to keep its horizontal and vertical balance so as to ensure straightness of laser irradiation and keep precision of patterning.

Using the glass cliché dipped in the etching solution as a subject for irradiation, a predetermined desired pattern is formed therein (S210). A laser moving trajectory corresponding to the predetermined desired pattern may be input in advance and then used for driving the laser source such that a desired pattern may be formed automatically.

The region irradiated by laser as mentioned above partially brings improvement of an etching speed thermochemically or optochemically, thereby locally increasing an etching speed. Also, since the etching progresses only in a direction irradiated by laser, a configuration capable of forming an etching pattern with a great aspect ratio may be realized.

Etching occurs in a region irradiated by laser, so a distance from a laser irradiation apparatus to a cliché surface is preferably controlled such that a focus may be formed at the glass surface. Also, in case a depth to be etched is greater than a depth of focus of laser, it is preferred that the position of a lens is controlled according to an etched depth as the etching work progresses.

In addition, in order to sufficiently improve an optochemical or thermochemical etching speed by laser, it is required to use a wavelength absorbed by a glass to be etched, but glasses generally have no absorption in a visible ray or UV ray region, so it is advantageous to use fourth harmonics of Nd:YAG laser or use a laser having a wavelength in UV region such as KrF laser or ArF laser for etching. Also, if the intensity of radiation is sufficient at a focus portion of laser, multiphoton absorption occurs to generate optochemical or thermochemical etching, so using a laser with a wavelength in UV region is not essential.

As an example, UV rays in 355 nm wavelength, which is third harmonics of Nd:YAG laser are not absorbed in a glass cliché, but multiphoton absorption occurs when using a pulse laser in Q switching manner with high pulse energy, which allows dry etching or wet etching of a glass cliché.

After the laser irradiating step is performed as mentioned above, the glass cliché is washed using water or distilled water (S220).

Figure 4:
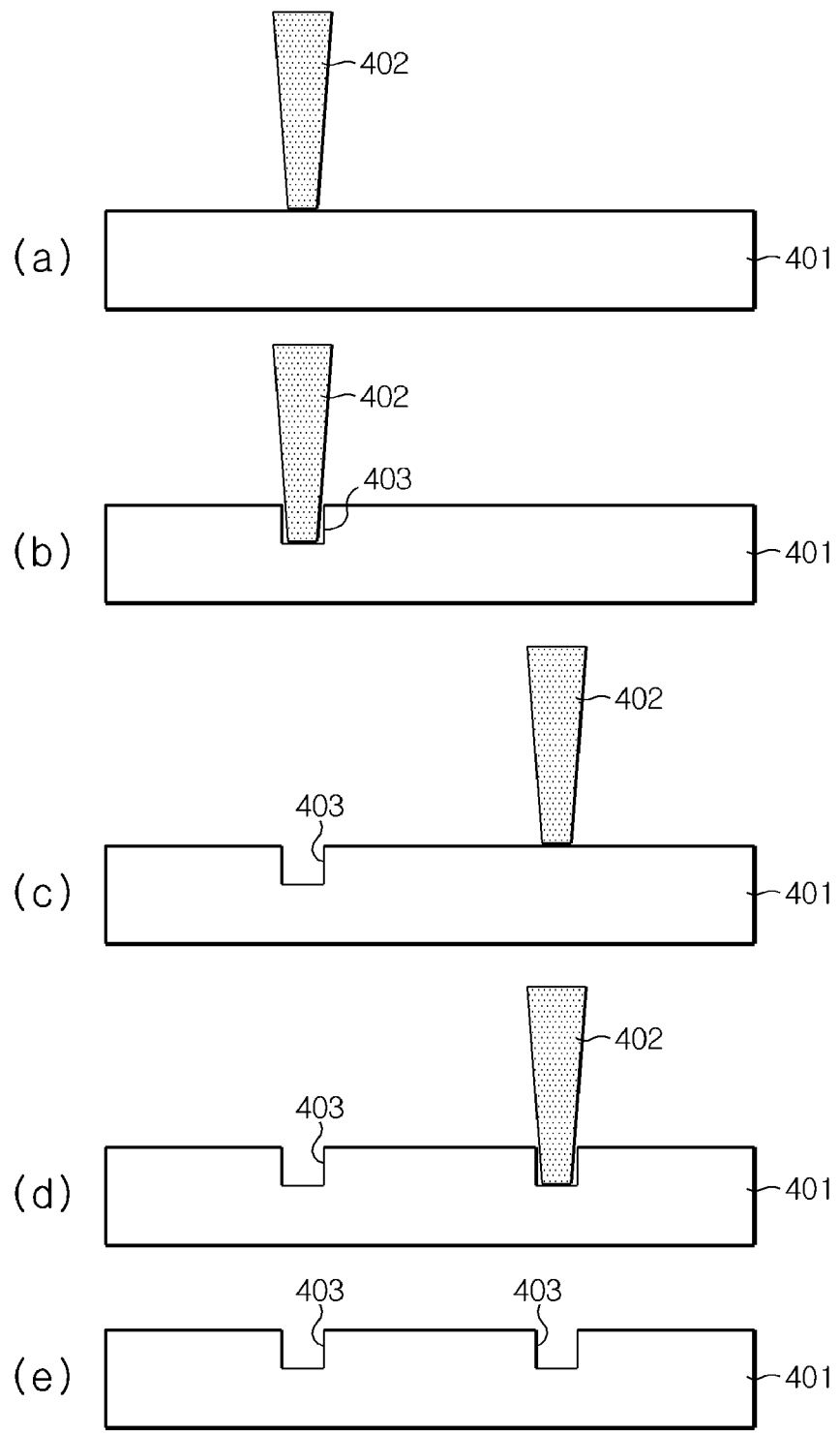
FIG. 4 is a flowchart illustrating a laser etching process according to an embodiment of the present invention.

The laser etching method mentioned above is now explained below in more detail with reference to FIG. 4.

Laser beam 402 is irradiated to a glass cliché 401 as shown in FIG. 4(a). Though not shown in the figure, the glass cliché shown in FIG. 4(a) is presumed as being dipped in an etching solution.

If the laser beam 402 is irradiated, etching occurs in an irradiated region along an irradiation direction (namely, in a vertical direction), thereby forming a blanket 403 as shown in FIG. 4(b). The processes explained above based on FIGS. 4(a) and 4(b) are repeatedly applied to another point of the glass cliché to form a different pattern (see FIGS. 4(c) and 4(d)), and as a result a glass cliché 401 having the blanket 403 as shown in FIG. 4(e) is manufactured.

Also, in the present invention, the patterning step S210 is preferably executed such that a pattern is formed by means of a plurality of laser irradiation surfaces irradiated to the glass cliché. Namely, in case a plurality of patterns are formed, using only one laser requires a lot of working time as much. Also, speed or progress of etching reaction by an etching solution may be varied between a pattern formed former and a pattern formed later, so it is more preferred that a plurality of irradiation surfaces are formed to ensure precise formation of many patterns.

In order to form a plurality of laser irradiation surfaces, various methods may be used. For example, a plurality of laser sources may be used, and light emitted from one laser or a plurality of lasers may be split using several partially transmitting mirrors. Also, an optical diffraction device may be used to split light one or several laser lights into more lights, and a polygon mirror rotating at a high speed may also be used to split light. In addition, a digital mirror device may also be used to expose a certain area to light. Such methods may be applied depending on implementation patterns or work conditions.

Figure 5:
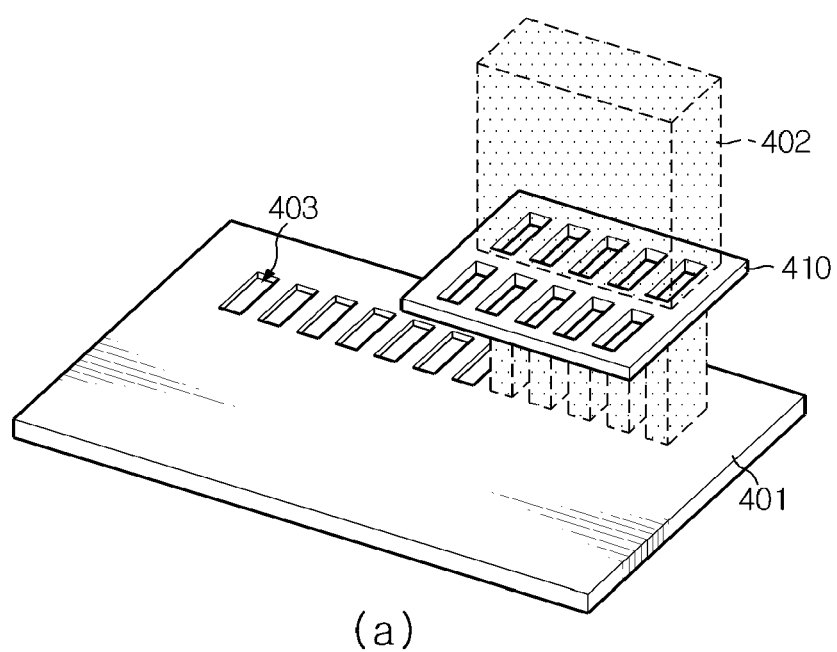
FIG. 5 is a schematic view showing a laser etching process according to another embodiment of the present invention.
Figure 5:
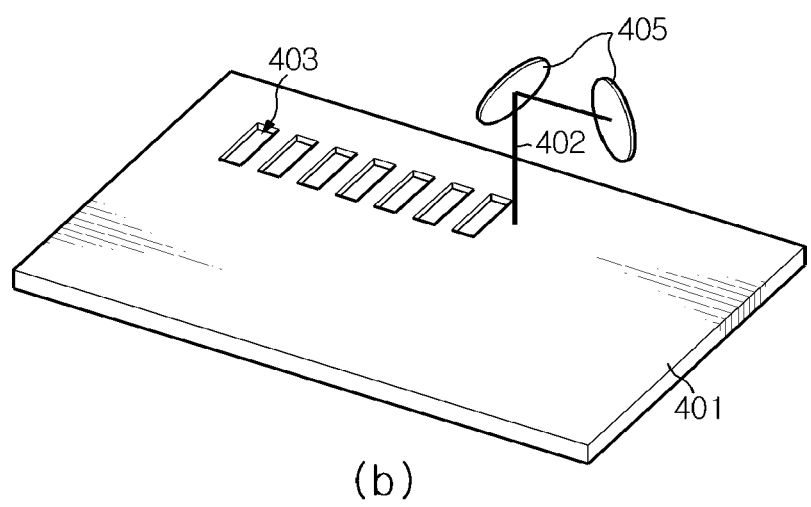

Moreover, in order to form a plurality of irradiation surfaces, as shown in FIG. 5, a shadow mask may be used (FIG. 5(a)), and a scanning method may also be used (FIG. 5(b)).

As shown in FIG. 5, the laser covering a wide area at once is preferably irradiated to a mask having a laser transmission pattern identical to the pattern to be formed on the glass cliché such that a desired pattern is formed at the same time. Since the laser is transmitted through the pattern formed in the mask, a laser having a plurality of irradiation areas may be irradiated in a desired pattern on the glass cliché.

In case a shadow mask is used, laser is irradiated over a wide area at once, so a laser with high energy such as excimer laser is used advantageously. This kind of laser may etch a wide area within a short time and facilitate processing a pattern with various line widths. This laser may adopt excimer laser such as KrF laser and ArF laser.

Along with it, as shown in FIG. 5(b), a scanner is used for moving a laser beam 402 concentrated on a focus to a desired position by using two independently driven mirrors 405 such that the laser beam 402 is moved into a desired shape and thus forms a blanket 403 on the glass cliché 401 at an accelerated etching speed.

In case etching is conducted using a laser beam concentrated on a focus in a scanning manner, this etching method may be applied directly to various kinds of patterns, and particularly it is effective in forming a line-shaped pattern. The laser processing using the scanner manner may adopt $CO_2$ laser, Nd:YAG laser, He—Cd laser or the like.

Hereinafter, a configuration having a time-functional laser irradiation area or width for accomplish another object of the present invention is explained in detail.

To achieve another object, the patterning step (S210) of the present invention preferably includes an input step (S212) for receiving shape information of a pattern to be formed, a calculating step (S214) for calculating area information of a laser irradiation surface corresponding to the image information, and an irradiating step (S216) for irradiating laser having differential irradiation areas according to irradiation time based on the calculation area information to form a pattern. Also, a laser irradiation apparatus 300 for realizing the above method includes an input unit 302, a calculation unit 304, a controller 306 and a laser source 308.

Figure 6:
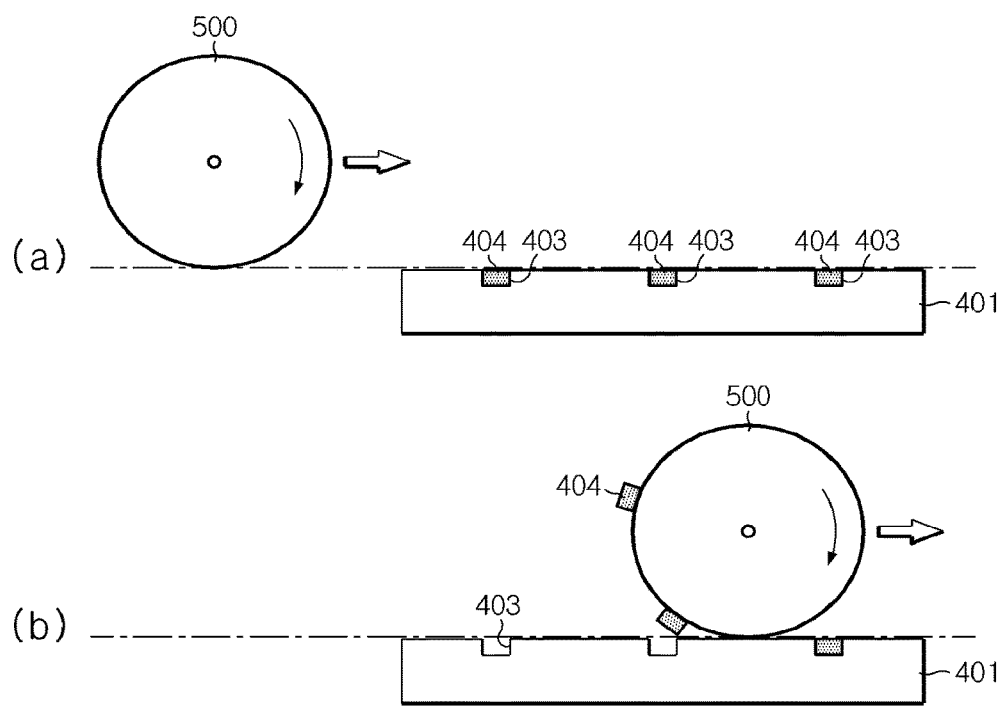
FIG. 6 is a schematic view showing a printing process using an organic cliché.

As shown in FIG. 6, in the offset printing method, as a predetermined roll means 500 rotates, a pattern material 404 transcribed to a blanket 403 of a glass cliché 401 is moved to the roll means 500 as a pattern identical to the pattern of the glass cliché, and as a following work, the pattern of the roll means is transcribed again to a predetermined cliché that needs transcription.

During the above procedure, the roll means 500 continuously applies a physical load to the glass cliché 401, which may cause a crack in the glass cliché. Also, in case the pattern material 404 transcribed to the blanket 403 of the glass cliché 401 is moved to the roll means 500, a tangential direction of the roll means may be considered as being coincided with a horizontal direction of the blanket when the roll means is in contact with the blanket. However, since the roll means makes rotation, both directions are not coincided before or after the contact period.

Due to such a physical movement, printing materials not moved to the roll means remain in the blanket, for example in a lower side of the blanket.

For an effective solution to the above problem, the pattern formed on the glass cliché is preferably wider in its lower portion than in its upper portion so as to distribute force and improve easy movement of the pattern material. The shape of the pattern may also be modified in various ways, including a trapezoidal shape with a longer base, according to work environments, pattern material, features of the roll means, physical characteristics of the glass cliché, or the like.

The input unit 302 of the laser irradiation apparatus 300 of the present invention for realizing the above configuration firstly receives shape information of a pattern, which will be formed, in case laser is irradiated to a glass cliché (S212). Various information such as shape features of the pattern, an aspect ratio, a ratio of top and bottom of a pattern depth, a linear feature of a terminal end, and so on are input.

After that, the calculation unit 304 calculates an actual irradiation area or a width of irradiated laser beam according to a time function in consideration of the input shape information, intensity and wavelength of laser source, power supply environments and so on as variables such that the irradiated laser may correspond to the shape of the pattern (S214).

Figure 7:
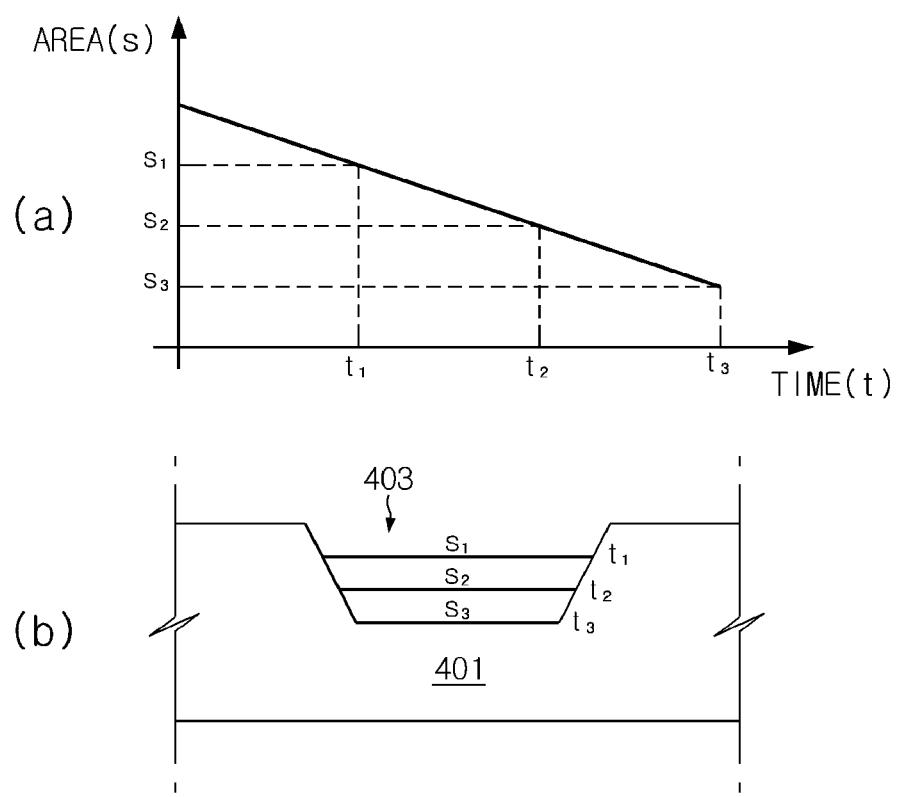
FIG. 7 shows a differential irradiation method based on laser irradiation areas according to a preferred embodiment of the present invention.
Figure 8:
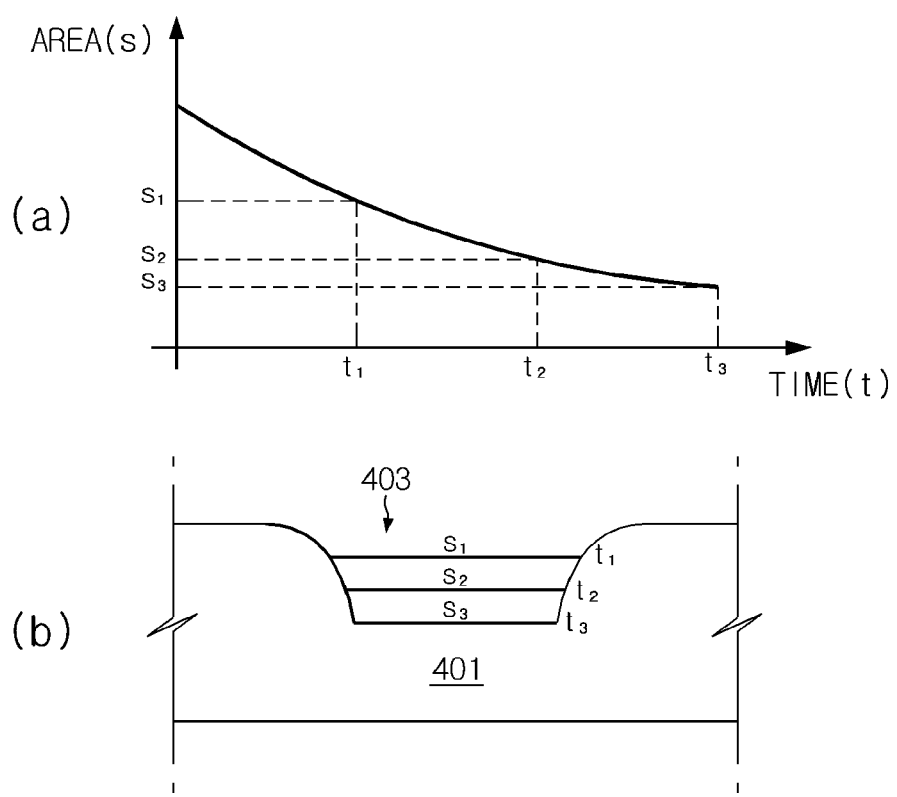
FIG. 8 shows a differential irradiation method based on laser irradiation areas according to another embodiment of the present invention.

Namely, as shown in FIGS. 7(a) and 8(a) illustrating a laser irradiation area function using time (t) as an x axis and an irradiation area (s) as a y axis, the calculation unit 304 calculates an irradiation area value according to time during which laser should be irradiated.

As the controller 306 of the present invention controls the laser source 308 to irradiate a laser corresponding to the calculated result, a laser having differential irradiation areas according to irradiation time based on the calculated area information is irradiated to form a desired pattern (S216).

As a laser whose irradiation area is decreased as the irradiation time goes is irradiated to form a pattern as mentioned above, the physical force applied from the roll means 500 to the glass cliché is effectively dispersed, which facilitates effectively prevention of any crack in the glass cliché and improves durability of the glass cliché. Also, it is possible to move the pattern material to the roll means in an easier way, and also it is possible not to remain any residue of pattern material in the glass cliché.

The components of the laser irradiation apparatus 300 as mentioned above should be considered not as physically distinguishable components but as logically distinguishable components. Namely, each component is corresponding to a logic element realized by an electric or electronic circuit configurable to realize the spirit of the present invention. Thus, though some components are integrally operated or any component is separately operated, they should be considered as being included in the scope of the present invention if they may realize the function executed by the logic components of the present invention.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

According to the present invention, there is no need to use a photoresist or a photo mask on a glass cliché in advance, so it is possible to manufacture a glass cliché with simple processes at a low cost.

Also, since the improved features of the wet etching against a laser irradiation surfaces are used, it is possible to easily form a pattern with a great aspect ratio and fine line widths. In addition, effective etching is ensured even with a laser source having small energy, so the present invention may provide a more economic glass cliché manufacturing method.

Further, since differential etching according to irradiation time is conducted to form a patter on a glass cliché, it is possible to form a pattern structure capable of effectively dispersing a physical force of a roll means, transferred to the glass cliché. Also, using the above structure, it is possible to minimize any residue of pattern material.

What is claimed is:

1. An apparatus for laser irradiation, which is used for laser etching to form a pattern on a glass cliché dipped in an etching solution by irradiating laser thereto, the apparatus comprising:

an irradiating laser beam produced by a movable excimer laser source that is movable in a vertical direction with respect to a cliché surface so that a distance between the movable excimer laser source and the cliché surface can be controlled such that a focus of the irradiating laser beam can be formed at the cliché surface;

a focusing lens, the position of which between the laser source and the cliché surface is controlled according to an etched depth as the etching progresses to maintain a focus of the laser beam on the cliché surface at the etched depth;

a shadow mask comprising a laser transmission pattern identical to the pattern to be formed on the glass cliché, the pattern forming a plurality of laser irradiation areas on the glass cliché when the irradiating laser beam is transmitted through the pattern of the shadow mask;

an input unit comprising an electronic circuit configured for receiving shape information of the pattern to be formed;

a calculation unit comprising an electronic circuit configured for calculating area information of a laser irradiation surface corresponding to the shape information; and a controller configured for controlling the movable excimer laser source.

2. The apparatus for laser irradiation according to claim 1, wherein the controller is configured to control the movable excimer laser source according to an irradiation time based on the calculated area information.

3. The apparatus for laser irradiation according to claim 1, wherein the movable excimer laser is a KrF laser or an ArF laser.

* * * * *